United States Patent Office 3,113,307
Patented Dec. 3, 1963

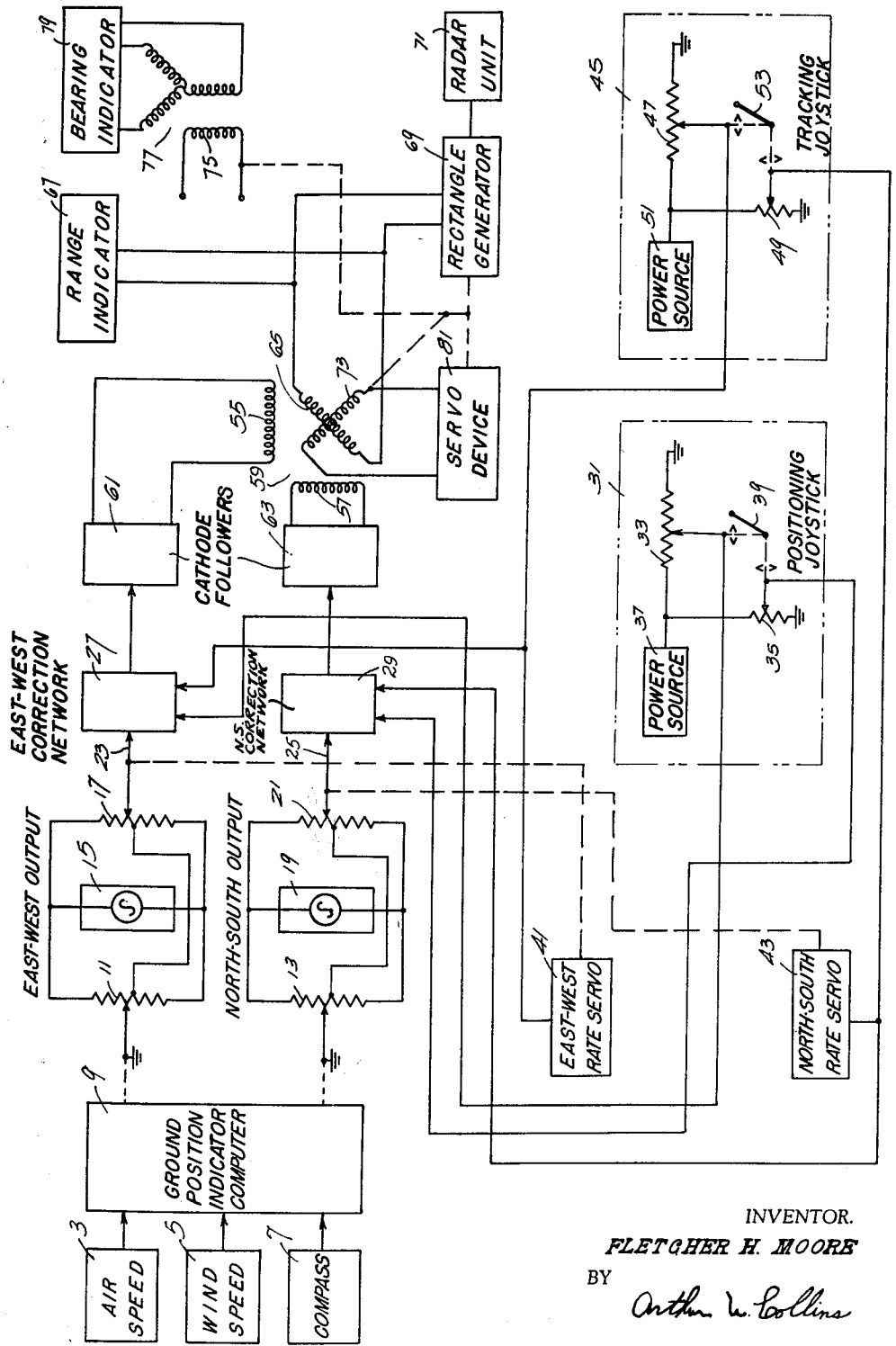

3,113,307
RATE-CORRECTION TRACKING CIRCUIT
Fletcher H. Moore, Port Washington, N.Y., assignor, by mesne assignments, to the United States of America as represented by the Secretary of the Navy
Filed Sept. 9, 1959, Ser. No. 839,039
1 Claim. (Cl. 343—7.3)

This is a continuation-in-part of co-pending application Serial No. 704,213 filed December 20, 1957, now abandoned.

The present invention relates to a novel and improved target tracking system and more particularly to an automatic tracking system which initially uses available radar information to detect a target and which thereafter guides navigation to the target without the use of radar.

In various types of airborne target searching and tracking operations and particularly in anti-submarine warfare operations, it often becomes necessary and desirable to be able to detect a potential target from a considerable distance and to thereafter make a silent approach to the target without the use of radar. In this way a forewarning of the approach of the aircraft will not aid the possibility of an escape of the target. Although various types of apparatus and equipment have been proposed in the past to permit an approach of the target without the use of radar, considerable difficulty has been experienced heretofore in devising such apparatus which is relatively simple in construction and yet sufficiently reliable and dependable in operation.

Accordingly, it is a principal object of the present invention to provide novel and improved automatic target tracking apparatus which allows accurate approach of the target without the use of radar.

It is a further object of the present invention to provide novel and improved automatic target tracking apparatus of the silent approach type wherein corrections for inherent errors of the computing device and for movement of the target itself may be made.

Other objects and many of the attendant advantages of this invention will be readily appreciated as the same becomes better understood by reference to the following detailed description when considered in connection with the accompanying drawings wherein:

FIG. 1 is a diagrammatic view of a preferred embodiment of the present invention.

A preferred embodiment of the present invention is illustrated in FIG. 1 of the drawing. As shown therein, the airspeed unit 3 and the wind speed device 5 utilize aircraft aid velocity and wind velocity information to produce a pair of suitable shaft rotations or electrical potentials which are respectively proportional to the north-south and east-west components of the ground velocity of the aircraft. The mechanical or electrical outputs of the airspeed and wind speed units 3 and 5 are then fed together with aircraft heading information of the compass unit 7 into the ground position indicator computer 9. The computer produces two separate mechanical output movements which are respectively proportional to the east-west and north-south components of the velocity of the aircraft with respect to the target. These movements individually determine and control the electrical contact positions of the grounded variable arms of potentiometers 11 and 13. Potentiometer 11, which is controlled by the east-west mechanical output movement of the computer 9, is electrically connected in parallel with the energy source 15 and the potentiometer 17. The center-taps of potentiometers 11 and 17 are interconnected as shown. Similarly, potentiometer 13 which is controlled by the north-south mechanical output movement of computer 9 is connected in parallel with the energy source 19 and potentiometer 21. The center-taps of potentiometers 13 and 21 are also interconnected as shown. The variable arms of potentiometers 17 and 21 are electrically coupled through conductors 23 and 25 respectively to the east-west and north-south position correction networks 27 and 29.

The structural details of the airspeed unit 3, the wind speed unit 5, the compass unit 7, and the ground position indicator computer 9 are well known in the art and by themselves form no part of the present invention. For a full understanding of the invention, it need only be understood that when the position of some ground point or fix such as the location of a submarine or other target is known with respect to the aircraft at some initial time, then the speed of the aircraft as indicated by the airspeed unit 3, its wind speed as indicated by wind speed unit 5, and its direction of movement as indicated by the compass unit 7 may be used to compute the position of the fix at any future time. Detailed information concerning the structure and design of a suitable ground position computer can be found in Volume 2 of the M.I.T. Radiation Laboratory Series at pages 122–128.

The joy stick device 31, which as will be more apparent hereinafter is used to originally position the target submarine in the center of a tracking rectangle on a radar indicator, includes the potentiometers 33 and 35 each of which is electrically connected between the source of electrical potential 37 and ground. The position of the variable arm of potentiometer 33 is controlled in any conventional manner by left to right or east and west movements of the joy stick lever 39 and the position of the variable arm of potentiometer 35 is controlled by up and down or north and south movements of the lever 39. The variable arms of potentiometers 33 and 35 are respectively electrically connected to the east and west and north and south position connection networks 27 and 29.

The tracking joy stick device 45, which as will also be more apparent hereinafter is used to correct errors of the computer as it tracks the target, includes the potentiometers 47 and 49 which are electrically connected between the source of electrical potential 51 and ground. The position of the variable arm of potentiometer 47 is controlled by left to right or east-west movements of the tracking joy stick lever 53 and the position of the variable arm of potentiometer 49 is controlled by the up and down or north and south movements of the lever 53. The variable arms of potentiometers 47 and 49 are respectively electrically connected to the east-west and the north-south servos 41 and 43 which mechanically control the dispositions of the variable arms of potentiometers 17 and 21 of the computer 9. The variable arms of potentiometers 47 and 49 are also respectively electrically coupled to the east-west and the north-south position correction networks 27 and 29.

The east-west and north-south position correction networks 27 and 29, which are of any suitable conventional design, combine the respective voltage output circuits of potentiometers 17 and 21 of the computer 9, of potentiometers 47 and 49 of the tracking joy stick device 45, and of potentiometers 33 and 35 of the positioning joy stick 31. The output circuits of the east-west and north-south position correction networks are in turn respectively coupled to the stationary windings 55 and 57 of the resolver 59 through the cathode follower circuits 61 and 63. The terminals of the rotor winding 65 of the resolver 59 are connected to the range indicating device 67 which preferably directly converts its A.C. input voltage into miles to target. The output terminals of winding 65 of the resolver are also coupled to the tracking rectangle generator 69 which is in turn coupled to the radar apparatus 71. Details of structure and design of a suitable type of rectangle generator of this kind can be found in United States Patent No. 2,774,964 issued December 18, 1956, to R. E. Baker and F. D. Covely. Rotor winding 73 of the resolver 59 is mechanically interconnected with the rotor 75 of selsyn generator 77 which in turn energizes the bearing indicator device 79. The output terminals of winding 73 of the resolver are connected to the servo device 81 which controls rotary movement of winding 73 in a conventional synchro follow-up loop. The rotary output of the servo device 81 is also fed into the tracking rectangle generator 69 as shown.

In the operation of the above described apparatus the pilot of the aircraft first energizes his radar equipment. When he observes a suitable target on the screen of the radar indicator 71, he operates the joy stick device 31 until the target is positioned within the tracking rectangle produced by the generator 69 which circumscribes the target. This is accomplished by properly varying the east-west, north-south voltage inputs to the position connection networks 27 and 29 from potentiometers 33 and 35, thereby determining the potentials of the voltages fed through the cathode followers 61 and 63 and resolver 59 to the tracking rectangle generator 69. The pilot then switches in the computer 9 and depending upon the speed and direction of the aircraft as recorded by the airspeed unit 3, the wind speed unit 5 and the compass unit 7 the grounded variable arms of potentiometers 11 and 13 are respectively adjusted such that the output voltages of potentiometers 17 and 21 with respect to ground provide a continuous measure of the east-west and north-south coordinate distances of the aircraft to the target. Thus, the output voltages of potentiometers 17 and 21 either add or subtract to or from the original positioning voltages of the tracking rectangle depending on the aircraft flight path to automatically track the selected target.

If the pilot or radar operator then notes that the tracking rectangle does not remain properly centered about the selected target on the radar screen, he repositions the rectangle over the target by moving the joy stick device 45 in an appropriate direction. In doing this voltages from potentiometers 47 and 49 are fed into the position correction networks 27 and 29 and are superimposed upon the tracking generator control voltages from potentiometers 17 and 21 thereby causing the radar target to become again centrally positioned within the rectangle on the radar screen. Rate correction voltages are also simultaneously fed from the potentiometers 47 and 49 into the east-west and north-south rate servos 41 and 43 to readjust the positions of the variable arms of potentiometers 17 and 21 and thereby reduce the original tracking error. The operator continues to adjust the position of joy stick 53 until the proper rate adjustment is fed into servos 41 and 43 and the tracking rectangle remains properly over the radar target. The pilot then deenergizes the radar equipment and completes a silent approach to the target area.

As shown in the drawing the east-west and the north-south rectangular coordinate voltages which are obtained at the position correction network output circuits are preferably then converted into polar coordinate voltages. This is accomplished by means of the conventional resolver 59 with its quadrature wound rotor windings 65 and 73 and the selsyn generator 77. Thus, as winding 65 of the resolver is energized the range of the target with respect to the aircraft is read directly on the range indicator 67 and as the angular position of winding 73 of the resolver varies the three phase output circuit of the selsyn generator 77 also varies and the bearing of the target with respect to the aircraft is read directly on the target bearing indicating device 79.

Obviously many modifications and variations of the present invention are possible in the light of the above teachings. It is therefore to be understood that within the scope of the appended claim the invention may be practiced otherwise than as specifically described.

What is claimed is:

Apparatus for continuously indicating the position of a target with respect to a moving object said apparatus comprising a radar unit; a tracking rectangle generator coupled to the radar unit; a computer having a first output shaft, the position of which is continuously proportional to movement of the object along one axis of a rectangular coordinate system, and a second output shaft, the position of which is continuously proportional to movement of the object along the other axis of the rectangular coordinate system; a first potentiometer having a variable arm coupled to the first output shaft of the computer; a second potentiometer having a variable arm coupled to the second output shaft of the computer; a third potentiometer having a variable arm; circuit means including the first potentiometer for applying a potential across the third potentiometer proportional to the disposition of the variable arm of the first potentiometer; a fourth potentiometer having a variable arm; circuit means including the second potentiometer for applying a potential across the fourth potentiometer proportional to the disposition of the variable arm of the second potentiometer; circuit means coupled to the variable arms of the third and fourth potentiometers for controlling the response of the tracking rectangle generator; first manually operable means for applying an original biasing potential to the variable arms of the third and fourth potentiometers to simulate the original position of the target; and second manually operable means for mechanically controlling the disposition of the variable arms of the third and fourth potentiometers to apply a computer error correction signal to the tracking rectangle generator coupling circuit means.

No references cited.